US008675522B2

(12) United States Patent
Keesara et al.

(10) Patent No.: US 8,675,522 B2
(45) Date of Patent: Mar. 18, 2014

(54) CONVEYING THE VLAN/L2 VSN/BRIDGING-DOMAIN OF THE INCOMING INTERFACE (IIF) WHEN TRANSPORTING MULTICAST TRAFFIC OVER A SHORTEST PATH BRIDGED (SPB) NETWORK

(75) Inventors: Srikanth Keesara, Tewksbury, MA (US); Richard Thomas Strong, Amherst, NH (US); Deborah Ellen Fitzgerald, Acton, MA (US)

(73) Assignee: Avaya Inc., Basking Ridge, NJ (US)

( * ) Notice: Subject to any disclaimer, the term of this patent is extended or adjusted under 35 U.S.C. 154(b) by 167 days.

(21) Appl. No.: 13/241,869

(22) Filed: Sep. 23, 2011

(65) Prior Publication Data

US 2013/0077624 A1    Mar. 28, 2013

(51) Int. Cl.
*H04Q 3/545* (2006.01)

(52) U.S. Cl.
USPC ............ 370/256; 370/254; 370/389; 370/911

(58) Field of Classification Search
None
See application file for complete search history.

(56) References Cited

U.S. PATENT DOCUMENTS

| | | | | |
|---|---|---|---|---|
| 8,284,656 | B2 * | 10/2012 | Saha et al. | 370/219 |
| 8,331,220 | B2 * | 12/2012 | Kitada | 370/217 |
| 2007/0253326 | A1 * | 11/2007 | Saha et al. | 370/217 |
| 2009/0296568 | A1 * | 12/2009 | Kitada | 370/221 |
| 2010/0309912 | A1 * | 12/2010 | Mehta et al. | 370/390 |
| 2012/0033541 | A1 * | 2/2012 | Da Silva et al. | 370/217 |
| 2012/0033672 | A1 * | 2/2012 | Page et al. | 370/395.53 |
| 2012/0127855 | A1 * | 5/2012 | Alon et al. | 370/218 |
| 2012/0182866 | A1 * | 7/2012 | Vinayagam et al. | 370/228 |

OTHER PUBLICATIONS

Internet Engineering Task Force (IETF), A. Banerjee et al., Request for Comments: 6165, Category: Standards Track, ISSN: 2070-1721, Apr. 2011, "Extensions to IS-IS for Layer-2 Systems".*
Network Working Group, D. Fedyk, P. Ashwood-Smith, dated Mar. 8, 2011, "IS-IS Extensions Supporting IEEE 802.1aq Shortest Path Bridging, draft-ietf-isis-ieee-aq-05.txt".*
David Allan, Peter Ashwood-Smith, Nigel Bragg, János Farkas, Don Fedyk, Michel Ouellete, Mick Seaman, Paul Unbehagen, titled "Shortest Path Bridging: Efficient Control of Larger Ethernet Networks", was presented in IEEE Communications Magazine, having a publication date of Oct. 2010, vol. 48, Issue 10, pp. 128-135.*

(Continued)

*Primary Examiner* — Andrew Lai
*Assistant Examiner* — Hoyet H Andrews
(74) *Attorney, Agent, or Firm* — Anderson Gorecki & Rouille LLP

(57) ABSTRACT

Techniques disclosed herein include systems and methods for improving multicast traffic operations in a Shortest Path Bridging (SPB) network by conveying bridging domain information of an incoming interface (IIF) when transporting multicast traffic over the SPB network. Techniques disclosed herein include modifying encapsulation packet header information of existing Mac-In-Mac fields to convey additional information that can be interpreted at edge nodes by modifying edge node interpretation of multicast data. Specifically, the value of the I-SID in the BMAC-DA field can be set to be different from the I-SID value in the I-TAG field. Carrying the L2 VSN I-SID value in the I-TAG allows the Egress BEBs to determine which VLAN/L2 VSN/Bridging-Domain of the IIF is in use, and then modify or preserve underlying header information accordingly.

20 Claims, 6 Drawing Sheets

(56) References Cited

OTHER PUBLICATIONS

Fedyk et al., titled "Virtual Bridged Local Area Networks—Amendment <>: Shortest Path Bridging" was prepared by the Interworking Task Group of IEEE 802.1, having a publication date of Sep. 21, 2011, as a Draft Standard for Local and Metropolitan Area Networks and also identified as P802.1aq/D4.3, Draft Amendment to IEEE Std. 802.1Q-2011.*

Allan et al., titled "Shortest Path Bridging: Efficient Control of Larger Ethernet Networks" (Allan hereinafter) was presented in IEEE Communications Magazine, having a publication date of Oct. 2010, vol. 48, Issue 10, pp. 128-135.*

A. Banerjee et al., titled, Request for Comments: 6165, Category: Standards Track, ISSN: 2070-1721, Extensions to IS-IS for Layer-2 Systems.*

Fedyk et al, titled,"IS-IS Extensions Supporting IEEE 802.1 aq Shortest Path Bridging, draft-ietf-isis-ieee-aq-05.txt".*

* cited by examiner

CONVEYING THE VLAN/L2 VSN/BRIDGING-DOMAIN OF THE INCOMING INTERFACE (IIF) WHEN TRANSPORTING MULTICAST TRAFFIC OVER A SHORTEST PATH BRIDGED (SPB) NETWORK

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

One type of network technology is known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality. There exist other related technologies that follow the model of a provider network (transport network) that connects two or more customer networks (access networks), where the provider network is functionally distinct from the customer network, even if a single administrator runs both networks.

For example, one technology is Provider Backbone Bridges (PBB) technology. A PBB network is a L2-Bridged network that uses Mac-In-Mac encapsulation to transfer user L2 traffic between two or more L2 networks that are located at the edge of the PBB network (provider network). Note that a PBB network includes all networks that use Mac-In-Mac encapsulation technology, including, but not limited to, networks that use the Shortest Path Bridging Technology commonly referred to as SPB or SPBV or SPBM. The PBB network typically includes a Backbone Edge Bridge (BEB) and a Backbone Core Bridge (BCB). BEBs (also known as provider network edge nodes) function as devices that enable transfer of packets to/from interfaces within the PBB network and to/from interfaces outside the PBB network. BCBs (also known as provider core nodes) enable transfer of packets between interfaces that are within the PBB network.

SUMMARY

Shortest Path Bridging (SPB) technology is a protocol for building efficient transport networks. SPB networks can transport data packets without needing to examine customer information at every node. One needed enhancement to SPB technology is the ability to transport Layer 3 (L3) multicast traffic efficiently over an SPB Network.

At a high level, a typical forwarding paradigm for L3 multicast streams over an SPB network is a multiple step process. A control plane using SPB sets up a tree that is followed by traffic from a sender Backbone Edge Bridge (BEB) to receiver BEBs. Sender BEBs are also known as Ingress BEBs, while receiver BEBs are also known as Egress BEBs. A multicast stream is received by the sender BEB at an incoming interface (IIF), and then encapsulated by the sender BEB by using a Mac-In-Mac encapsulation header. The multicast stream reaches the receiver BEBs by following a forwarding tree setup by the control plane. Devices in the SPB Network lookup some information from the encapsulation header to make forwarding decisions on the packets. Specifically, the information looked up includes Backbone Virtual local Area Network (BVLAN) and a Backbone Media Access Control (MAC) destination address header (BMAC-DA) information. Receiver (egress) BEBs decapsulate a received packet and send out that packet on one or more outgoing access interfaces (OIFs) to an access/customer network, or to receiving devices. If the outgoing interface (OIF) on the receiver BEB is in the same Virtual Local Area Network (VLAN)/Layer 2 Virtual Services Network (L2VSN)/Layer 2 Bridging Domain as the incoming interface (IIF) on the sender BEB, then the source MAC address of the decapsulated packet, should be preserved. If the outgoing interface (OIF) on the receiver BEB is not in the same VLAN/L2VSN/Bridging-Domain as the IIF on the sender BEB, then the source MAC address of the decapsulated packet, should be replaced by a source MAC address that belongs to (that represents) the receiver BEB to follow IP multicast protocols.

Such a process can be problematic because the sender BEB and the receiver BEB are most often physically separate devices (nodes) in the network. Moreover, the Mac-In-Mac encapsulation header—that is added to the packet by the sender BEB—identifies the tree that the packet has to follow in the SPB network, yet does not identify the VLAN/L2VSN/Bridging-Domain of the incoming interface (IIF).

Techniques disclosed herein improve multicast traffic operations in an SPB network. Techniques disclosed herein include modifying encapsulation packet header information of existing fields to convey additional information, as well as modifying node interpretation of multicast data.

A conventional multicast Mac-In-Mac encapsulation header that is added to a given packet by an Ingress BEB can include four fields (among other fields). One field is the destination Backbone MAC address (BMAC-DA). The BMAC-DA is made up of a 24-bit Organizationally Unique Identifier (OUI), which identifies the Ingress BEB, and a 24-bit Backbone Service Instance Identifier (I-SID), which is specified in IEEE 802.1ah. An I-SID can identify a given data stream resource or service attachment information, or otherwise distinguish services within a PBB domain. A second field is the source Backbone MAC address (BMAC-SA). A third field is a Backbone VLAN tag (BVLAN-TAG), which carries VLAN information. A fourth field is a Backbone Service Instance Tag (I-TAG) specified to carry a 24-bit I-SID.

The 24-bit I-SID value in the BMAC-DA and the 24-bit I-SID value in the I-TAG carry the same value in conventional Mac-In-Mac encapsulation, and identify the Layer 2 Virtual Services Network (L2 VSN) to which the packet belongs. Switches in the SPB Network use (BVLAN, BMAC-DA) lookups to determine how to forward multicast packets. Using the L2 VSN I-SID in the BMAC-DA would cause the packets to be sent to all the BEBs hosting the L2 VSN, which is inefficient. According to techniques disclosed herein, the value of I-SID used in the BMAC-DA is set different from the one used for the L2 VSN. Such a difference allows traffic to follow only the paths in the network leading to BEBs that have active receivers interested in the multicast stream. Following conventional rules would have resulted in the I-SID value in the I-TAG being set to the same value as the I-SID value in the BMAC-DA. In such a configuration, there is no part of the Mac-In-Mac encapsulation header that actually carries information that would allow a receiver BEB to determine the L2 VSN to which the IIF belongs.

Techniques disclosed herein include a discovery that transit forwarding of packets in an SPB Network depends only on (BVLAN, BMAC-DA) information. Also, the value of the I-SID in the I-TAG—in headers designated as multicast—is important only on the Ingress and Egress BEBs, and thus can be set differently from the value of the I-SID in the BMAC-DA. In one technique, a value of the I-SID in the I-TAG is set equal to the I-SID value assigned to the L2 VSN. Additionally, the value of the I-SID in the BMAC-DA field is set to be different from the I-SID value in the I-TAG field. Carrying the L2 VSN I-SID value in the I-TAG allows the Egress BEBs to determine which VLAN/L2 VSN/Bridging-Domain of the IIF is in use. Accordingly, the operation of adding a Mac-In-Mac encapsulation to a packet and sending it over the SPB network is modified such as to be able to convey the VLAN/L2 VSN/Bridging-Domain of the IIF from the sender BEB to the receiver BEBs. Creative use of the I-SID values in the BMAC-DA and the I-TAG achieves efficient multicast forwarding as well all being able to convey the VLAN/L2VSN/Bridging-Domain of the IIF, without burdening Backbone Core Bridges (BCBs) with any additional multicast processing.

One embodiment includes a multicast manager that executes a multicast routing process and/or system as a Layer 2 service within a Shortest Path Bridging (SPB) network. The multicast manager receives a multicast data packet at a first data switching device, such as part of a sequence or stream of multicast data packets. The first data switching device functions as a first Backbone Edge Bridge within a transport network. This transport network uses Shortest Path Bridging (SPB) protocol. The multicast data packet has a Mac-in-Mac encapsulation header added by a second data switching device. The second data switching device functions as a second Backbone Edge Bridge within the transport network. The multicast data packet is received via the transport network from the second data switching device. The Mac-in-Mac encapsulation header carries a data Backbone Service Instance Identifier (I-SID) set in a Backbone Media Access Control Destination Address (BMAC-DA) field of the Mac-in-Mac encapsulation header. This data I-SID identifies a multicast data stream corresponding to the multicast data packet. The Mac-in-Mac encapsulation header also carries a Layer 2 I-SID set in a Backbone Service Instance Tag (I-TAG) field of the Mac-in-Mac encapsulation header. The Layer 2 I-SID identifies a Layer 2 bridging domain corresponding to the multicast data packet. The Layer 2 I-SID carries a different value as compared to a value of the data I-SID.

The multicast manager executes a lookup at the first data switching device. The lookup identifies Layer 2 bridging domain information of an incoming interface of the multicast data packet and Layer 2 bridging domain information of an outgoing interface of the multicast data packet. This incoming interface connects a sender of the multicast data stream with the second data switching device. The outgoing interface connects a receiver of the multicast data stream with the first data switching device. The first data switching device then removes the Mac-in-Mac encapsulation header. In response to identifying that a Layer 2 bridging domain corresponding to the outgoing interface is different than a Layer 2 bridging domain corresponding to the incoming interface, the multicast manager (and/or first data switching device) modifies a Customer Media Access Control (MAC) Source Address carried in a Customer MAC header field of the multicast data packet. The first data switching device forwards this multicast data packet on the outgoing interface without the Mac-in-Mac encapsulation header.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a multicast data packet at a first data switching device, the first data switching device functioning as a first Backbone Edge Bridge within a transport network using Shortest Path Bridging (SPB) protocol, the multicast data packet having a Mac-in-Mac encapsulation header added by a second data switching device, the second data switching device functioning as a second Backbone Edge Bridge within the transport network, the multicast data packet received via the transport network from the second data switching device, the Mac-in-Mac encapsulation header carrying a data Backbone Service Instance Identifier (I-SID) set in a Backbone Media Access Control Destination Address (BMAC-DA) field of the Mac-in-Mac encapsulation header, the data I-SID identifying a multicast data stream corresponding to the multicast data packet, the Mac-in-Mac encapsulation header also carrying a Layer 2 I-SID set in a Backbone Service Instance Tag (I-TAG) field of the Mac-in-Mac encapsulation header, the Layer 2 I-SID identifying a Layer 2 bridging domain corresponding to the multicast data packet, the Layer 2 I-SID carrying a different value as compared to a value of the data I-SID; executing a lookup at the first data switching device, the lookup identifying Layer 2 bridging domain information of an incoming interface of the multicast data packet and Layer 2 bridging domain information of an outgoing interface of the multicast data packet, the incoming interface connecting a sender of the multicast data stream with the second data switching device, the outgoing interface connecting a receiver of the multicast data stream with the first data switching device; removing the Mac-in-Mac encapsulation header; in response to identifying that a Layer 2 bridging domain corresponding to the outgoing interface is different than a Layer 2 bridging domain corresponding to the incoming interface, modifying a Customer Media Access Control (MAC) Source Address carried in a Customer MAC header field of the multicast data packet; and forwarding the multicast data packet on the outgoing interface without the Mac-in-Mac encapsulation header. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting SPB multicast routing and associated operations. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
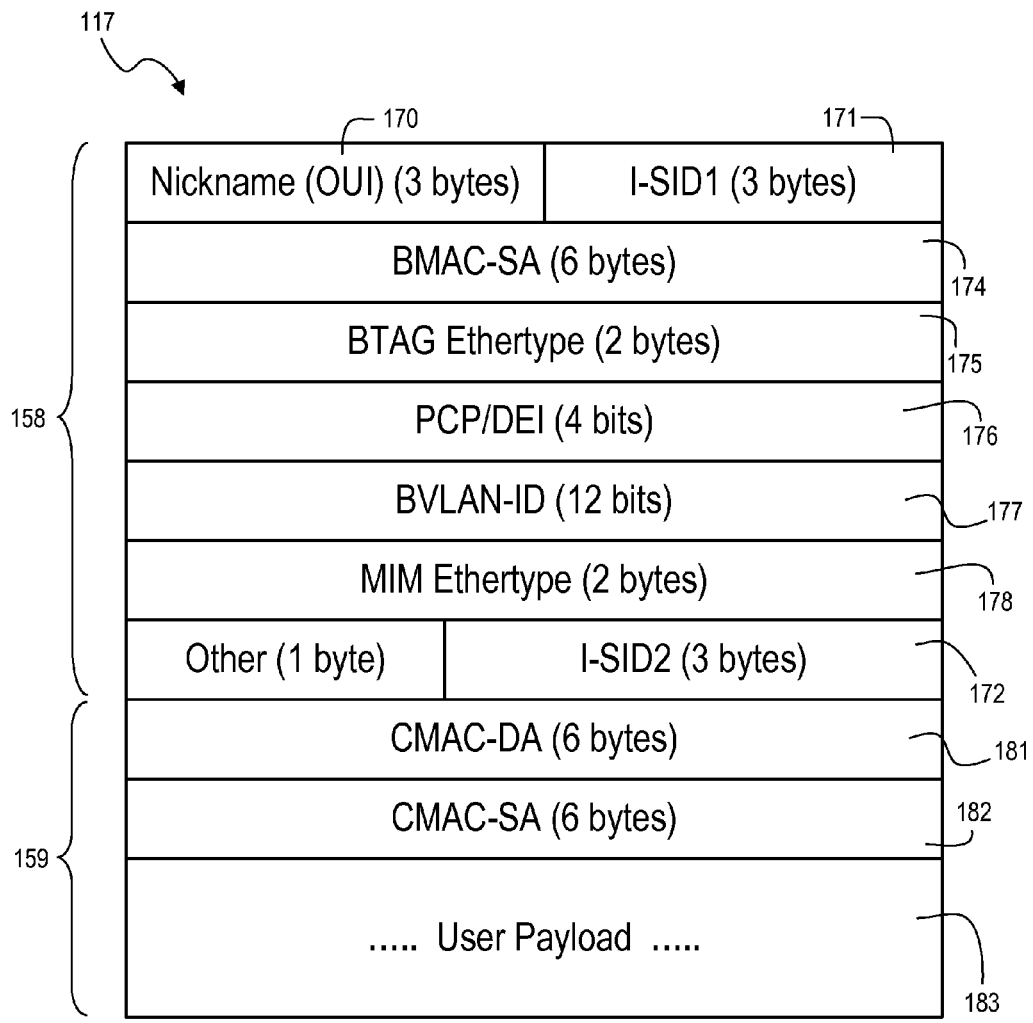
FIG. 1 is a diagram of an SPB Mac-In-Mac encapsulation header according to embodiments herein.

Techniques disclosed herein include systems and methods for improving multicast traffic operations in a Shortest Path Bridging (SPB) network by conveying bridging domain information of an incoming interface (IIF) when transporting multicast traffic over the SPB network. Techniques disclosed herein include modifying encapsulation packet header information of existing Mac-In-Mac fields to convey additional information that can be interpreted at edge nodes by modifying edge node interpretation of multicast data. Specifically, the value of the I-SID in the BMAC-DA field is set to be different from the I-SID value in the I-TAG field. Carrying the L2 VSN I-SID value in the I-TAG allows the Egress BEBs to determine which VLAN/L2 VSN/Bridging-Domain of the IIF is in use, and then modify or preserve underlying header information accordingly.

With respect to conventional Internet Protocol (IP) multicast forwarding, an interface in the context of switches and routers that forwards IP multicast traffic typically refers to a Layer 2 Service Instance and Port/Logical Port combination. A Layer 2 Service Instance is typically represented as a VLAN or Layer 2 Virtual Services Network (VSN) when using an SPB network for connecting access points within the Layer 2VSN. Two interfaces that have the same VLAN or L2VSN are said to be in the same Bridging Domain.

An Ethernet switch/router that forwards IP multicast traffic executes several steps. Such a router receives multicast traffic on an incoming interface, which is referred to as an IIF. The router sends a copy of the packet on one or more outgoing interfaces, which are referred to as OIFs. If an OIF is in the same Bridging Domain as the IIF, then the source MAC address of the packet is not modified before sending the copy over the OIF. If an OIF is not in the same Bridging Domain as the IIF, then the source MAC address of the packet is replaced by a MAC address representing the Switch/Router before sending it over this OIF.

In a scenario of a single device performing all multicast routing, a multicast sender sends multicast traffic to the IP multicast router. The multicast sender can be configured as an Internet Group Management Protocol (IGMP) sender, or other protocol used by multicast senders and receivers. The IP multicast router, in an example scenario, has one multicast receiver that is in the same bridging domain as the multicast sender, and one multicast receiver that is in a different bridging domain as the multicast sender. When forwarding to the in-domain receiver, the IP multicast router does not modify the packet on the copy sent. When forwarding to the out-of-domain receiver, the IP multicast router modifies the packet on the copy sent by replacing a MAC address on the incoming packet with a MAC address belonging to the IP Multicast Router. In this scenario, however, all the OIFs are directly connected to the IP Multicast Router that has the IIF. Managing the outgoing interfaces is relatively straightforward because the single IP multicast router device is directly connected to all of the senders and receivers and thus able to internally determine and manage the multicast interfaces, and can use that knowledge to make decisions on whether or not to replace the MAC source address.

There are significant challenges, however, within an SPB network because the SPB network is an encapsulation transport network with receivers scattered across the network. Unlike a single multicast router, the SPB network is a cloud.

Thus, knowing when to replace headers and when to preserve them is challenging within an SPB transport network. Moreover, as a transport network, core and edge nodes are typically neutral in that they encapsulate data packets and transmit them across the SPB network as efficiently as possible, which includes transporting without examining customer information. By encapsulating customer information, the SPB network does not need to interpret customer-specific data and protocols.

An SPB network is typically connected to multiple access networks, which are also known as customer networks. These access networks are logically distinct or separate from the SPB network, even if both are managed by a single administrator or single vendor. This SPB network can provide multicast and Layer 2 services. There exists a Layer 2 service that connects access networks with the SPB network. Multicast data packets received from senders in the access networks to be sent across the SPB network are encapsulated using Mac-in-Mac encapsulation according to SPB protocol.

A typical network frame for data packets received from an access network to be transported via the SPB network includes a Media Access Control (MAC) Destination Address (6 bytes), a MAC Source Address (6 bytes), and a payload of the customer/user data. In a multicast scenario, there exists multicast traffic originating from one source (or sometimes from more than one source) within the access network. There also exist multiple receivers who want to receive that multicast traffic. Thus, the multicast distribution model is a one-to-many transmission. Multicast receivers from the access networks may or may not belong to a same Virtual Local Area Network (VLAN) as the sender, but the SPB network notwithstanding needs to deliver traffic to each receiver. Both senders and receivers (in access networks) can be referred to as interfaces or referred to as having an interface that connects with a Backbone Edge Bridge of the SPB network. There is an Incoming Interface (IIF) for a sender of a multicast data stream, and an Outgoing Interface (OIF) for each receiver of that multicast data stream. These receivers and senders are typically located outside of the SPB cloud. The SPB cloud or network can include Backbone Edge Bridges and Backbone Core Bridges.

An SPB network typically executes Layer 2 services as a VLAN or a Layer 2 Virtual Services Network (L2VSN). Multicast traffic enters the SPB network from a given interface, which is typically a Layer 2 instance that is mapped to an I-SID. Two interfaces that have the same VLAN or L2VSN are defined as being in the same bridging domain. This means that these two interfaces share the same MAC table, lookup, and so forth. Sometimes it is possible that none of the interfaces (outgoing or incoming) are in the same VLAN. An OIF is an interface on which a receiver is connected. The receiver OIF definition can include the VLAN (logical interface), instead of just a physical port or link. A bridging domain is also known as a broadcast domain, which is a logical division of nodes within a computer network.

During operation, in a scenario where an OIF is in the same bridging domain as the IIF, the customer source MAC Address on a corresponding packet is preserved (not changed). In a scenario where the OIF is in a different bridging domain as compared to the IIF, then the customer source MAC address of a packet is replaced with a MAC address of a forwarding device, and the VLAN of the customer packet is replaced by the VLAN of the OIF on the forwarding device. In an SPB network, this forwarding device is usually the BEB that removes encapsulation. Thus, the MAC-SA and VLAN portion of a packet would be replaced, while the remainder of the packet would stay the same. In a typical scenario, there is at least one sender attached to the SPB cloud, and then multiple receivers elsewhere that are attached to the SPB cloud. The SPB network uses encapsulation headers to transport data packets across the SPB network.

FIG. 1 shows a representation of frame format 117 for IP multicast packets transmitted through the SPB network according to the SPB protocol. Section 159 identifies the original packet and headers received at the SPB network. The original packet includes Customer MAC Destination Address (CMAC-DA) 181, a Customer MAC Source Address (CMAC-SA) 182, and a user payload 183. Section 158 identifies items of the MAC-in-MAC encapsulation header. An ingress BEB adds this encapsulation header regardless of the bridging domain of any OIF, which may be used to send a copy of the packet, being the same or different from the IIF. This encapsulation header includes several defined fields of information. A Backbone MAC Destination Address (BMAC-DA) includes a combination of a nickname (OUI) field 170 of the egress BEB, and also an I-SID field 171. This data combination can also be defined as a BMAC-DA field that has an embedded I-SID. An I-SID is allocated by the ingress BEB and used to identify the multicast data stream. I-SID selection can be based on Intermediate System To Intermediate System (IS-IS) control messaging. The BMAC-SA 174 refers to the BEB executing the encapsulation. The encapsulation header can also include a BTAG Ethertype 175 and some priority information 176. There is a BVLAN-ID field 177, as well as a MIM Ethertype 178. There is also an I-TAG field 172, which is also known as the I-SID field 172. Note that I-SID field 171 and I-SID field 172 conventionally carry a same I-SID value, that is, SPB protocol specifies that these fields carry the exact same value. One distinction, though, is that I-SID 171 is actually embedded within the BMAC-DA, in that the BMAC-DA is comprised of a nickname (or system ID of a device) plus an I-SID value. Field 172, however, is a separate field within the encapsulation header specified to contain an I-SID value.

For conventional multicast traffic, both I-SID fields are set with the same value. This combined nickname and I-SID convention is used for multicast traffic within the SPB network instead of unicast traffic. A bit within the Mac-in-Mac encapsulation header can designate multicast traffic. Discoveries herein including recognizing that in the multicast Mac-in-Mac encapsulation there is redundant I-SID information. The VLAN tag of the encapsulation is used in the core SPB network to decide forwarding paths within the core, while the I-SID is used for customer de-multiplexing, so that data streams can be delivered to the correct customer network.

In a given SPB network and for a specific multicast data stream there is a BEB that can be considered as an ingress BEB, as well as one or more Backbone Edge Bridges considered as egress BEBs. Note that the ingress/egress BEB notation is relative to a direction of a particular multicast data stream. In an SPB network, any given device can function as an edge device or core device depending on a data stream origin and network topology.

The ingress BEB encapsulates data packets from a multicast data stream and sends those encapsulated packets through the SPB network, while egress BEBs decapsulated those packets before forwarding the underlying payload and header outside of the SPB network. The combined set of access interfaces of all of the egress BEBs constitutes the outgoing interface set, or outgoing interface list, for a particular multicast tree. From a user visibility point of view, there are outgoing interfaces and an incoming interfaces that connect multicast senders and receivers to the SPB network.

Figure 2:
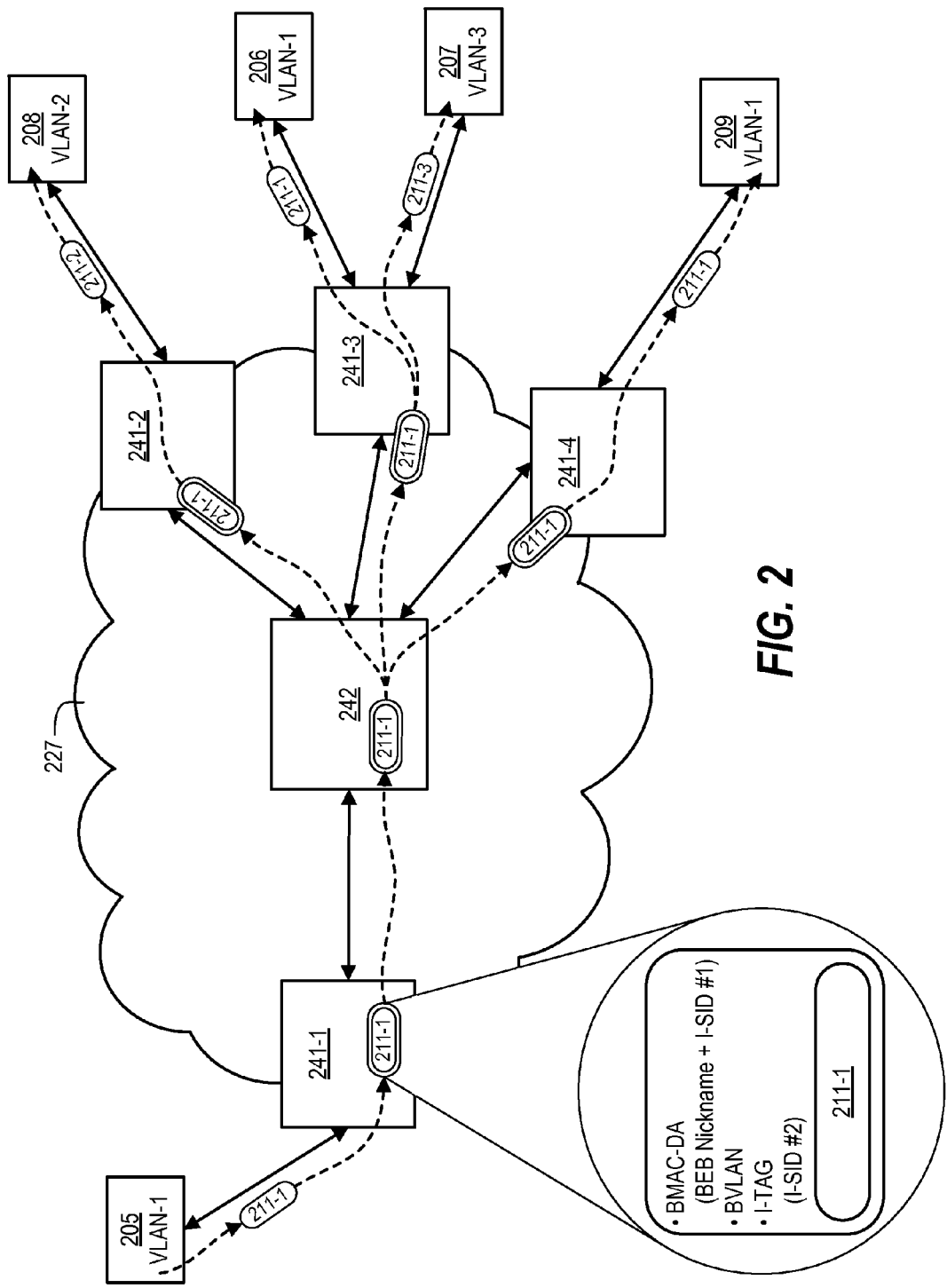
FIG. 2 is a block diagram of an SPB network providing multicast routing functionality according to embodiments herein.

IP multicast routing across an SPB network can involve more than one bridging domain. With multiple multicast receivers requesting a specific multicast data stream, one or more of those receivers are likely to be in different bridging domains. FIG. 2 illustrates IP multicasting over an SPB network 227, configured to manage multicast forwarding across multiple bridging domains. Outside of SPB network 227 there is sender 205, which has a multicast resource (data stream) to transmit to receivers 206, 207, 208, and 209. Receivers 206-209 are also located outside of the SPB network. For this non-limiting example, consider that receivers 206 and 209 are in the same bridging domain as sender 205, while receivers 207 and 208 are in a different bridging domain than the sender 205. To designate this, sender 205 and receivers 206 and 209 are shown as belonging to VLAN-1, receiver 208 is shown belonging to VLAN-2, while receiver 207 is shown belonging to VLAN-3. Sender 205 has a multicast stream or resource 211-1. BEB 241-1 encapsulates multicast data packets 211-1 from sender 205, and transmits these encapsulated multicast data packets via the SPB network to BEBs 241-2, 241-3, and 241-4.

Encapsulation by BEB 241-1 is shown in FIG. 2 and represented by a second outline surrounding multicast data packet 211-1. An enlargement of the packet 211-1 representation shows a portion of information included using encapsulation headers, such as those from section 158 of FIG. 1. BEB 241-1 allocates a data I-SID (I-SID #1) to a multicast data stream corresponding to packet 211-1. This data I-SID is used to identify the available multicast resource within the SPB network. BEB 241-1 embeds I-SID#1 within the BMAC-DA field of the Mac-in-Mac encapsulation. BEB 241-1 also selects a Layer 2 I-SID (I-SID#2) based on Layer 2 bridging domain information corresponding to multicast sender 205. For example, the I-SID#2 can reference or identify an Incoming Interface (IIF) connecting BEB 241-1 and multicast sender 205. The encapsulation also includes a BVLAN value, as well as additional values for fields shown in FIG. 1. Bits within the Mac-in-Mac encapsulation header are set accordingly to convey this information. Note that I-SID#1 carries a different value than the value carried by I-SID#2.

To execute IP multicast routing, upon receiving multicast data packets, egress BEBs need to replace a customer source MAC address with a different source MAC address for receivers that are outside of the bridging domain of sender 205. For receivers inside the bridging domain of sender 205, the customer source MAC address can be preserved. That is, for receivers within the same bridging domain, the ingress BEB does not need to modify the original packet headers. As such, after a given packet traverses the SPB network, that packet exits with its original VLAN tag or customer Ethernet header.

IP multicast routing specifies that for receivers within the same bridging domain as the sender, the customer MAC-SA field 182 must remain the same, that is, the values set in this field must be preserved. If, however, receivers are in different bridging domains (as is the case with receivers 207 and 208), then corresponding egress BEBs must replace the customer MAC-SAs. Note that the ingress BEB 241-1 does not modify customer headers in either scenario, but simply adds an encapsulation header and forwards the data packet 211-1 through the SPB network to BEBs 241-2, 241-3, and 241-4.

BEB 241-2 does a lookup on I-SID2 as well as doing a lookup on the BVLAN and BMAC-DA combination. An analysis of the result indicates that this Layer 2 I-SID does NOT belong to a same L2VSN as multicast Receiver 208, that is, receiver 208 is not in the same bridging domain as sender 205. In response, BEB 241-2 receives data packets from BEB 241-1 and replaces CMAC-SA 182 with a MAC address identifying BEB 241-2. A modified multicast data packet designated as 211-2 is then transmitted to receiver 208.

Continuing with this example, BEB 241-3 has receiver 206 that is in the same bridging domain and receiver 207 that is a different bridging domain as sender 205. BEB determines this by doing the same lookups and analysis that BEB 241-2 executed. In this scenario, when BEB 241-3 sends a copy of the packet to receiver 206, BEB 241-3 preserves the CMAC-SA address, which is represented by sending multicast data packet 211-1. Yet when BEB 241-3 sends a copy of the packet to receiver 207, BEB 241-3 must replace the CMAC-SA address, which is illustrated as BEB 241-3 forwarding multicast data packet 211-3 to receiver 207. For example, BEB 241-3 does a lookup on the Layer 2 I-SID (I-SID2) and also a (BVLAN, BMAC-DA) lookup, and the result indicates that Sender 205 belongs to the same L2VSN (bridging domain) as multicast Receiver 206, but not the same L2VSN as multicast Receiver 207.

As for BEB 241-4, BEB 241-4 does a lookup on I-SID2 and on BVLAN and BMAC-DA, and the result indicates that Sender 205 belongs to the same L2VSN as multicast Receiver 209. Thus, receiver 209 is in the same bridging domain as receiver 205, and as a response BEB 241-4 preserves the CMAC-SA address of the multicast data packet, shown by forwarding multicast data packet 211-1. Thus, FIG. 2 illustrates a scenario in which one BEB does not modify the original packet, another BEB modifies original packets, and a third BEB that must modify a part of the packet for copy on one OIF and preserve the packet for a copy on another OIF.

One problem that techniques herein solve is making sure that the egress nodes (such as BEBs 241-2, 241-3, and 241-4) have sufficient information to determine when to replace CMAC source addresses and went to preserve underlying header information. This is a problem because during Mac-in-Mac encapsulation, ingress node 241-1 dynamically allocates a data I-SID that identifies a given multicast resource or data stream. The I-SID is used by the SPB network for efficiently forwarding data packets, without respect to senders and receivers, that is, the I-SID does not indicate incoming interfaces of IP multicast senders. In alternative embodiments, the ingress node 241-1 can statically allocate the data I-SID to identify the given multicast resource.

Techniques disclosed herein provide a method of conveying outgoing interface information and incoming interface information across the SPB network. Techniques disclosed herein use the first I-SID instance 171 within the Mac-in-Mac header to efficiently forward data packets within the core. The I-SID field 172, however, is set with a value that identifies the Layer 2 bridging domain (or that includes information from which to derive the L2 bridging domain) of the incoming interface. Instead of setting the I-SID field 172 with the dynamically allocated I-SID (used to identify the multicast data stream), the ingress node 241-1 sets field 172 with an incoming interface identifier, that is, a different I-SID mapped to the incoming interface. Specifically, the incoming interface has Layer 2 virtualization, and a Layer 2 I-SID maps to this incoming interface. By indicating at least one of these, edge nodes can derive the other. Thus, a different I-SID is used in a portion of the destination address for efficient forwarding via the transport network. By identifying that I-SID field 172 is essentially redundant, I-SID field 172 can be modified to extend IP multicasting functionality across the SPB network.

Thus, a data I-SID (first I-SID) is carried within the BMAC-DA address field of the SPB MAC encapsulation header, while a Layer 2 I-SID (second I-SID) is carried within the I-TAG field of the encapsulation header. When such a modified encapsulation header reaches each egress node, each egress node executes a lookup on the Layer 2 I-SID value (lookup based on the I-TAG field), and identifies the incoming interface. Each BEB can maintain and/or access a mapping of Layer 2 I-SIDs to a local VLAN (local to each device). The egress node determines a set of outgoing interfaces, such as by executing a lookup using BVLAN and BMAC-DA information. Alternatively, the egress node can determines an outgoing interface list by executing a Source Group (S, G) lookup, where the (S, G) are obtained from the customer payload portion of the packet. With the incoming interface of the packet determined, and with a set of outgoing interfaces identified, the egress node can compare bridging domain information. If the egress node identifies that a given outgoing interface is in the same L2 VLAN to which the L2 I-SID (second I-SID) belongs, then the customer MAC-SA can be preserved.

The Layer 2 I-SID can functions as a service de-multiplexer, and effectively becomes an interface identifier. The Layer 2 I-SID can indicate which Layer 2 domain a given packet belongs to. With the outgoing interface list known at a given egress node, and by knowing that a particular outgoing interface has a VLAN associated with it, that egress node can identify whether these items are the same. If identified as the same, then the egress node determines not to replace the customer MAC source address. If, however, the Layer 2 I-SID lookup and OIF lookup indicates no matching local VLAN, or indicates that a matching local VLAN does not match a VLAN of the outgoing interface, then the egress node replaces the customer MAC source address. Thus, if a lookup and comparison of bridging domains identifies a matching VLAN, then the original packet can be preserved, while when the outgoing interface and VLAN are different, then the customer MAC source address is replaced.

In other words, the I-SID value for field 172 is set equal to the I-SID assigned to a Layer 2 VSN. The devices in the core will not look at the I-TAG I-SID value in field 172, because the encapsulation header identifies these packets as multicast instead of unicast. Backbone core bridges are typically not allowed to look beyond the encapsulation header. For edge devices however, once an edge device recognizes that it is functioning as an edge device for a particular data packet, then that edge device can examine header information underlying the encapsulation header. The multicast manager can then execute an additional lookup on the I-SID to the VLAN, and then the VLAN to the outgoing interface. A lookup on the I-SID can derive a local interface (incoming interface), which can be compared with every outgoing interface identified from a BVLAN and BMAC-DA lookup. If there is a match, then the IIF and OIF are identified as belonging to the same bridging domain or broadcast domain, and the customer MAC address does not need to be replaced. If the lookup identifies that the I-SID belongs to a different receiver L2VSN such that the IIF and OIF are in different bridging domains, then the customer MAC source address of the customer packet is replaced. Thus, by using a different I-SID value in the I-TAG field, as compared to the I-SID value embedded in the multicast BMAC-DA field, the system is able to preserve information about the incoming interface and recover that information at the other side of the SPB network. Without techniques disclosed herein, an SPB network would need to strictly manage and coordinate I-SID allocation. Such strict and global I-SID management reduces the efficiency and scalability of the network, and is also more error prone.

Figure 5:
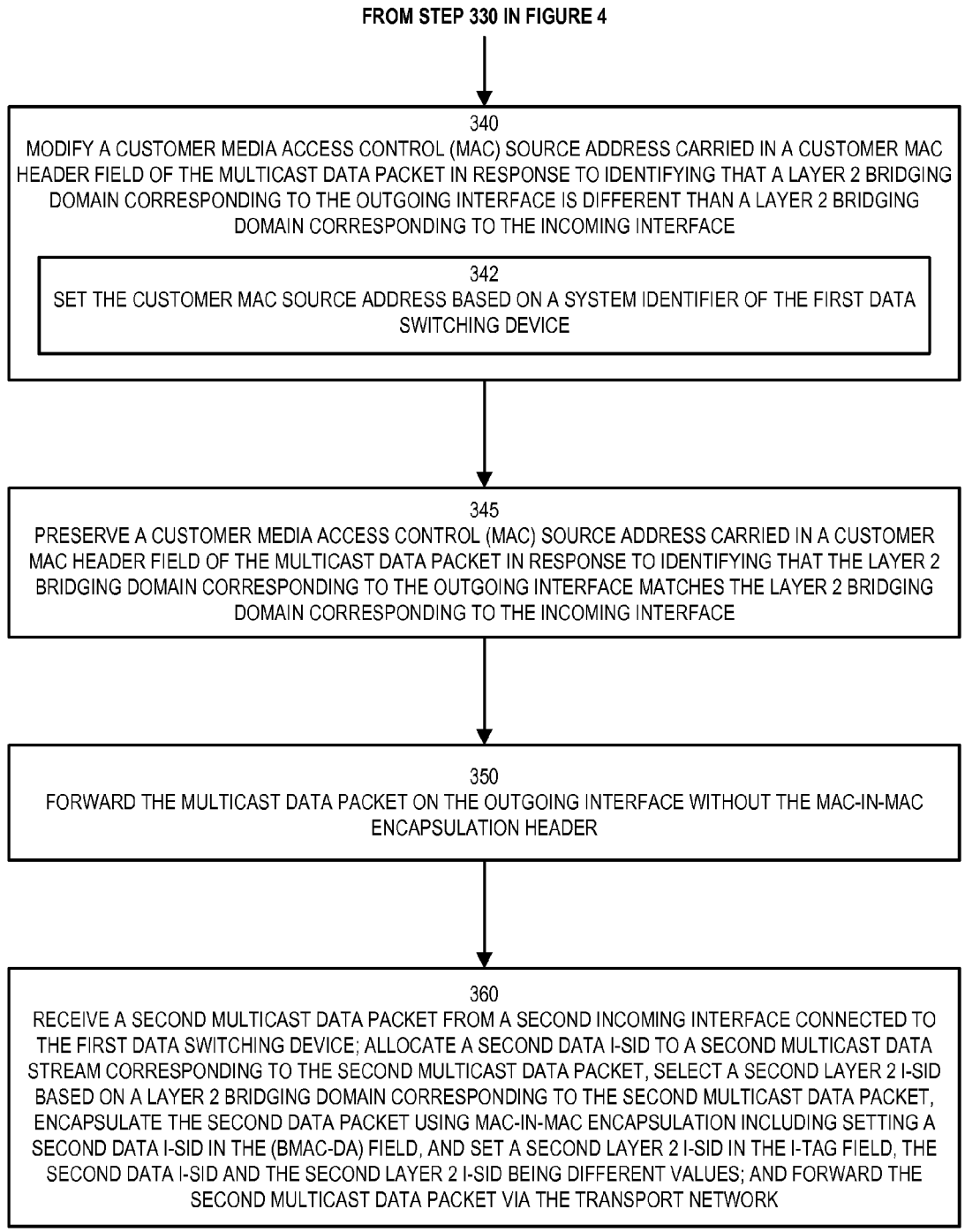
Figure 6:
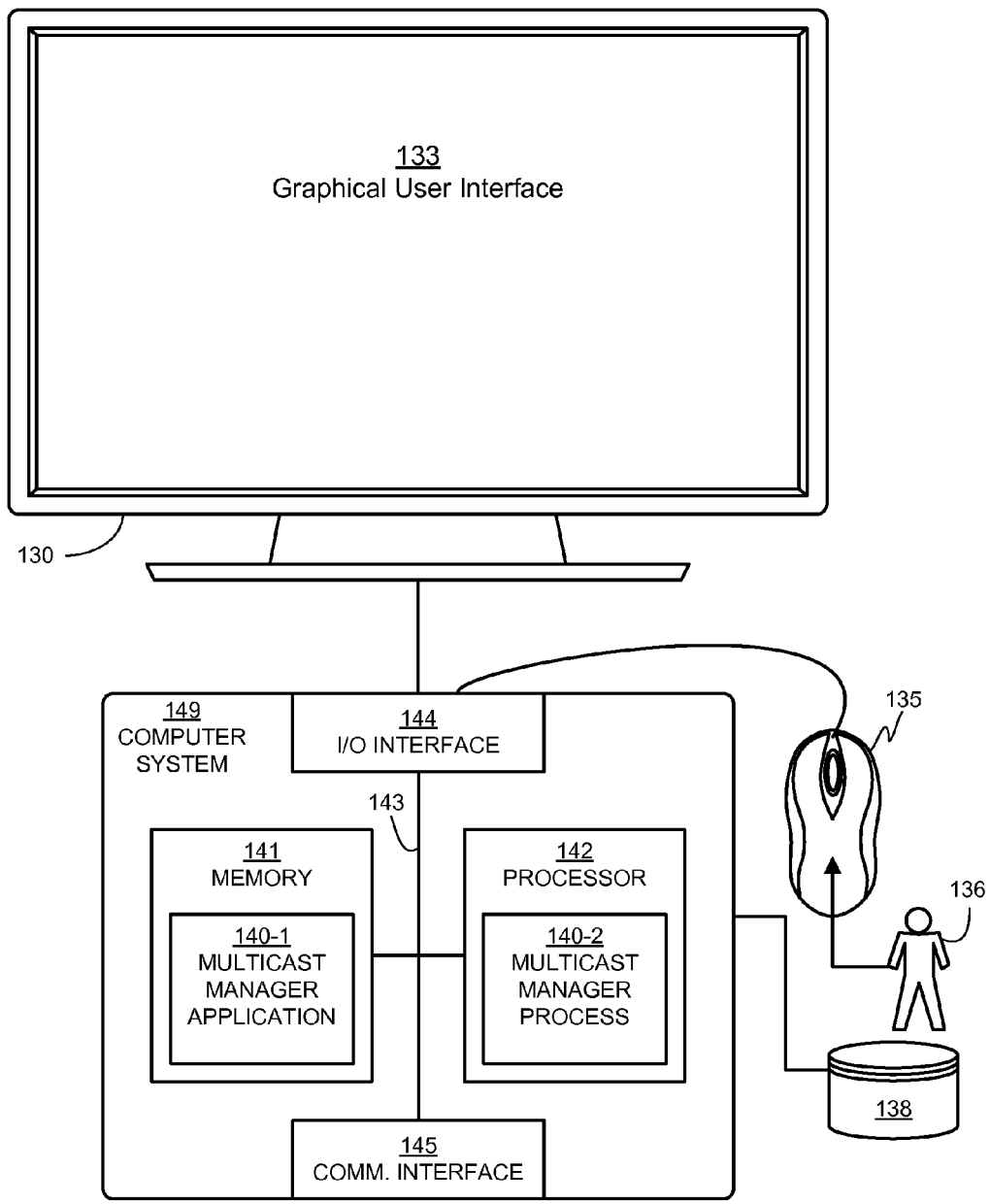
FIG. 6 is an example block diagram of a multicast manager operating in a computer/network environment according to embodiments herein.

FIG. 6 illustrates an example block diagram of a multicast manager 140 operating in a computer/network environment according to embodiments herein. Computer system hardware aspects of FIG. 6 will be described in more detail following a description of the flow charts. Functionality associated with multicast manager 140 will now be discussed via flowcharts and diagrams in FIG. 3 through FIG. 5. For purposes of the following discussion, the multicast manager 140 or other appropriate entity performs steps in the flowcharts.

Figure 3:
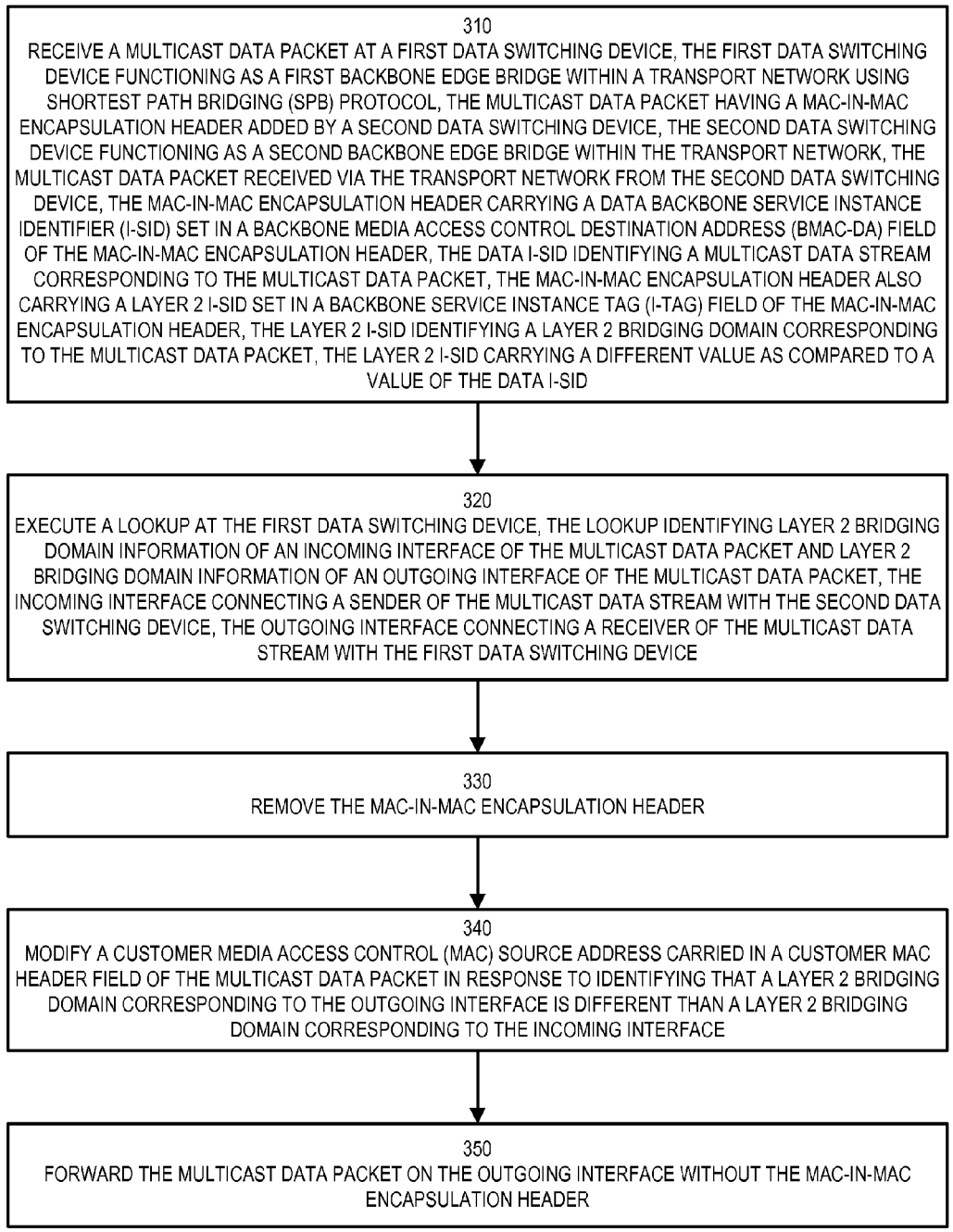
FIG. 3 is a flowchart illustrating an example of a process supporting multicast state creation in an SPB network according to embodiments herein.

Now describing embodiments more specifically, FIG. 3 is a flow chart illustrating embodiments disclosed herein. In step 310, multicast manager 140 receives a multicast data packet at a first data switching device. The first data switching device functions as a first Backbone Edge Bridge within a transport network using Shortest Path Bridging (SPB) protocol. The multicast data packet having a Mac-in-Mac encapsulation header added by a second data switching device. The second data switching device functions as a second Backbone Edge Bridge within the transport network. The multicast data packet is received via the transport network from the second data switching device. The Mac-in-Mac encapsulation header carries a data Backbone Service Instance Identifier (I-SID) set in a Backbone Media Access Control Destination Address (BMAC-DA) field of the Mac-in-Mac encapsulation header. The data I-SID identifies or indicates a multicast data stream corresponding to the multicast data packet. The Mac-in-Mac encapsulation header also carries a Layer 2 I-SID set in a Backbone Service Instance Tag (I-TAG) field of the Mac-in-Mac encapsulation header. The Layer 2 I-SID identifies a Layer 2 bridging domain corresponding to the multicast data packet. The Layer 2 I-SID (value in the I-TAG field) carries a different value as compared to a value of the data I-SID.

In step 320, the multicast manager 140 executes a lookup at the first data switching device. This lookup identifies Layer 2 bridging domain information of an incoming interface of the multicast data packet as well as Layer 2 bridging domain information of an outgoing interface of the multicast data packet. The incoming interface connects a sender of the multicast data stream with the second data switching device, while the outgoing interface connects a receiver of the multicast data stream with the first data switching device. For example, these interfaces can connect multicast senders and receivers to the SPB network. In some embodiments, this lookup can include multiple lookups and comparison, as will be described below. For example, a first lookup can identify the incoming interface while a second lookup identifies the outgoing interfaces. With the interfaces known, Layer 2 broadcast information can be looked up for each interface and then compared to thereby identify the Layer 2 bridging domain information of an incoming and outgoing interfaces.

In step 330, the first data switching device removes the Mac-in-Mac encapsulation header.

In step 340, the multicast manager 140 modifies a Customer Media Access Control (MAC) Source Address carried in a Customer MAC header field of the multicast data packet in response to identifying that a Layer 2 bridging domain corresponding to the outgoing interface is different than a Layer 2 bridging domain corresponding to the incoming interface. Thus, the multicast manager 140 modifies customer headers of the data packet when the receiver belongs to a different bridging domain as the sender.

In step 350, the first data switching device forwards the multicast data packet on the outgoing interface without the Mac-in-Mac encapsulation header.

Figure 4:
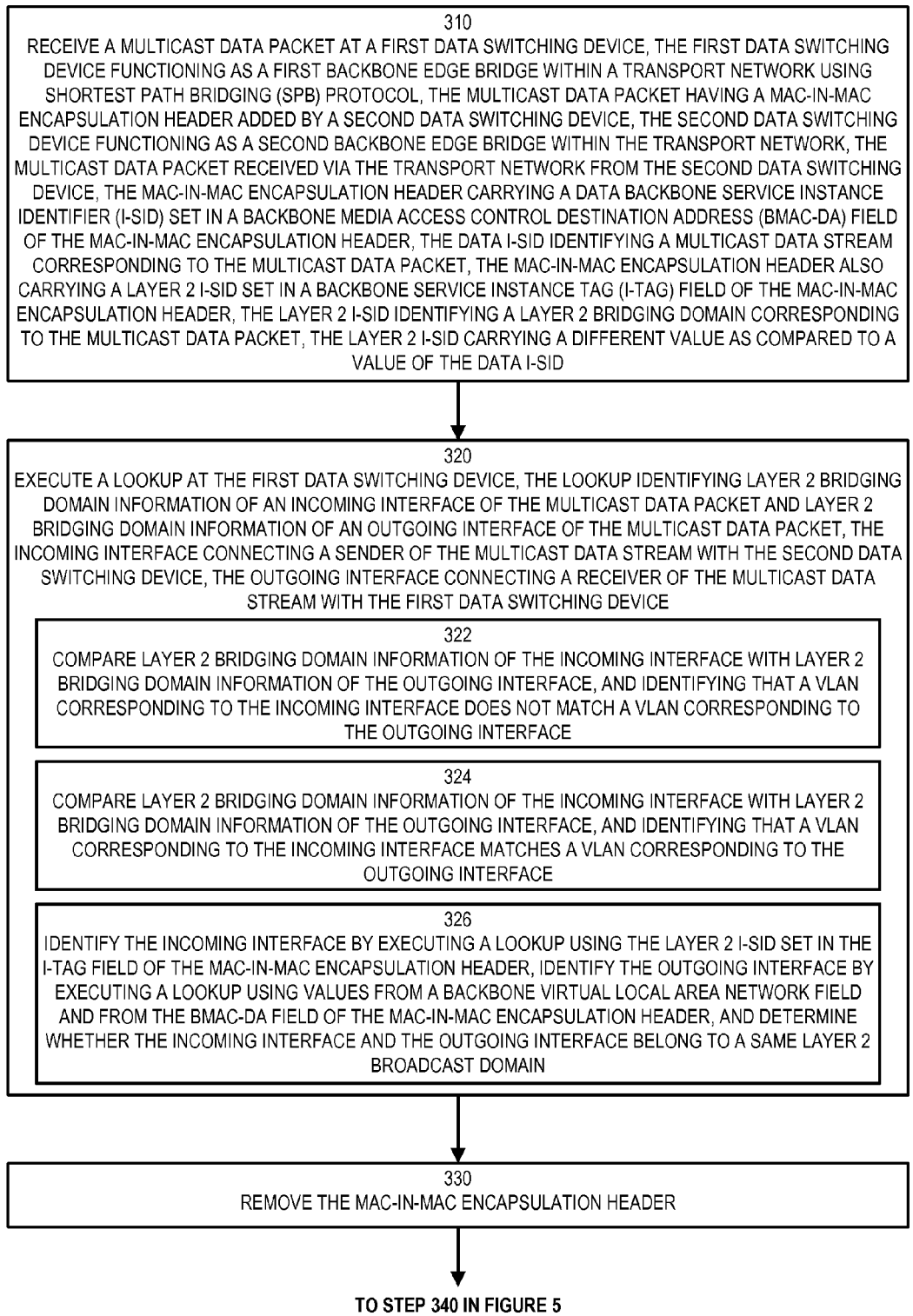
FIGS. 4-5 are a flowchart illustrating an example of a process supporting multicast state creation in an SPB network according to embodiments herein.

FIGS. 4-5 include a flow chart illustrating additional and/or alternative embodiments and optional functionality of the multicast manager 140 as disclosed herein.

In step 310, multicast manager 140 receives a multicast data packet at a first data switching device. The first data switching device functions as a first Backbone Edge Bridge within a transport network using Shortest Path Bridging (SPB) protocol. The multicast data packet having a Mac-in-Mac encapsulation header added by a second data switching device. The second data switching device functions as a second Backbone Edge Bridge within the transport network. The multicast data packet is received via the transport network from the second data switching device. The Mac-in-Mac encapsulation header carries a data Backbone Service Instance Identifier (I-SID) set in a Backbone Media Access Control Destination Address (BMAC-DA) field of the Mac-in-Mac encapsulation header. The data I-SID identifies or indicates a multicast data stream corresponding to the multicast data packet. The Mac-in-Mac encapsulation header also carries a Layer 2 I-SID set in a Backbone Service Instance Tag (I-TAG) field of the Mac-in-Mac encapsulation header. The Layer 2 I-SID identifies a Layer 2 bridging domain corresponding to the multicast data packet. The Layer 2 I-SID (value in the I-TAG field) carries a different value as compared to a value of the data I-SID.

In step 320, the multicast manager 140 executes a lookup at the first data switching device. This lookup identifies Layer 2 bridging domain information of an incoming interface of the multicast data packet as well as Layer 2 bridging domain information of an outgoing interface of the multicast data packet. The incoming interface connects a sender of the multicast data stream with the second data switching device, while the outgoing interface connects a receiver of the multicast data stream with the first data switching device.

In step 322, the multicast manager 140 compares Layer 2 bridging domain information of the incoming interface with Layer 2 bridging domain information of the outgoing interface, and identifies that a VLAN corresponding to the incoming interface does not match a VLAN corresponding to the outgoing interface.

In step 324, the multicast manager 140 compares Layer 2 bridging domain information of the incoming interface with Layer 2 bridging domain information of the outgoing interface, and identifies that a VLAN corresponding to the incoming interface matches a VLAN corresponding to the outgoing interface.

In step 326, the multicast manager identifies the incoming interface by executing a lookup using the Layer 2 I-SID set in the I-TAG field of the Mac-in-Mac encapsulation header. Thus, this second I-SID value in the encapsulation header is used to convey some bridging domain information, or information with which to identifying corresponding bridging domain information. In addition, the multicast manager 140 identifies the outgoing interface by executing a lookup using values from a Backbone Virtual Local Area Network field and from the BMAC-DA field of the Mac-in-Mac encapsulation header. In other words, the multicast manager 140 executes a (BVLAN, BMAC-DA) lookup, from which the multicast manager 140 derives bridging domain information for the outgoing interface. Alternatively, the multicast manager 140 can determine an outgoing interface list by executing a Source Group (S, G) lookup using (S, G) values obtained from the customer payload portion of the packet. The multicast manager 140 can then determine whether the incoming interface and the outgoing interface belong to a same Layer 2 broadcast domain, VLAN, Layer 2 Virtual Service, etc.

In step 330, the first data switching device removes the Mac-in-Mac encapsulation header.

In step 340, the multicast manager 140 modifies a Customer Media Access Control (MAC) Source Address carried in a Customer MAC header field of the multicast data packet in response to identifying that a Layer 2 bridging domain corresponding to the outgoing interface is different than a Layer 2 bridging domain corresponding to the incoming interface.

In step 342, the multicast manager 140 sets the Customer MAC Source Address based on a system identifier of the first data switching device, such as a MAC address of the first data switching device.

In step 345, the multicast manager 140 preserves a Customer Media Access Control (MAC) Source Address carried in a Customer MAC header field of the multicast data packet in response to identifying that the Layer 2 bridging domain corresponding to the outgoing interface matches the Layer 2 bridging domain corresponding to the incoming interface.

In step 350, the first data switching device forwards the multicast data packet on the outgoing interface without the Mac-in-Mac encapsulation header.

In step 360, the multicast manager 140 receives a second multicast data packet from a second incoming interface connected to the first data switching device. The multicast manager 140 then allocates a second data I-SID to a second multicast data stream corresponding to the second multicast data packet, and selects a second Layer 2 I-SID based on a Layer 2 bridging domain corresponding to the second multicast data packet. The first data switching device then encapsulates the second data packet using Mac-in-Mac encapsulation including setting a second data I-SID in the (BMAC-DA) field, and setting a second Layer 2 I-SID in the I-TAG field. For example, the lower 24 bits of the BMAC-DA (I-SID1) is set equal to a value signaled by the SPB control plane for the multicast data stream. The I-SID value in the I-TAG (I-SID2) can be set equal to an I-SID assigned to the Layer 2 Virtual Services Network. The second data I-SID and the second Layer 2 I-SID being different values. The first data switching device then forwards the second multicast data packet via the transport network. In other words, the first data switching device can also be configured to function as an ingress BEB for a different multicast data stream, encapsulate corresponding multicast data packets with a Layer 2 I-SID, and forward such packets to convey bridging domain information to egress BEBs within the SPB network.

Continuing with FIG. 6, the following discussion provides a basic embodiment indicating how to carry out functionality associated with the multicast manager 140 as discussed above. It should be noted, however, that the actual configuration for carrying out the multicast manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the multicast manager 140 of computer system 149 to communicate over a network and, if necessary, retrieve any data required to create views, process content, communicate with a user, etc. according to embodiments herein.

As shown, memory system 141 is encoded with multicast manager 140-1 that supports functionality as discussed above and as discussed further below. Multicast manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the multicast manager 140-1. Execution of the multicast manager 140-1 produces processing functionality in multicast manager process 140-2. In other words, the multicast manager process 140-2 represents one or more portions of the multicast manager 140 performing within or upon the processor 142 in the computer system 149.

It should be noted that, in addition to the multicast manager process 140-2 that carries out method operations as discussed herein, other embodiments herein include the multicast manager 140-1 itself (i.e., the un-executed or non-performing logic instructions and/or data). The multicast manager 140-1 may be stored on a non-transitory, tangible computer-readable storage medium including computer readable storage media such as floppy disk, hard disk, optical medium, etc. According to other embodiments, the multicast manager 140-1 can also be stored in a memory type system such as in firmware, read only memory (ROM), or, as in this example, as executable code within the memory system 141.

In addition to these embodiments, it should also be noted that other embodiments herein include the execution of the multicast manager 140-1 in processor 142 as the multicast manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for packet switching in a Shortest Path Bridging (SPB) network, the computer-implemented method comprising:

receiving a multicast data packet at a first data switching device, the first data switching device functioning as a first Backbone Edge Bridge within a transport network using Shortest Path Bridging (SPB) protocol, the multicast data packet having a Mac-in-Mac encapsulation header added by a second data switching device, the second data switching device functioning as a second Backbone Edge Bridge within the transport network, the multicast data packet received via the transport network from the second data switching device, the Mac-in-Mac encapsulation header carrying a data Backbone Service Instance Identifier (I-SID) set in a Backbone Media Access Control Destination Address (BMAC-DA) field of the Mac-in-Mac encapsulation header, the data I-SID identifying a multicast data stream corresponding to the multicast data packet, the Mac-in-Mac encapsulation header also carrying a Layer 2 I-SID set in a Backbone Service Instance Tag (I-TAG) field of the Mac-in-Mac encapsulation header, the Layer 2 I-SID identifying a Layer 2 bridging domain corresponding to the multicast data packet, the Layer 2 I-SID carrying a different value as compared to a value of the data I-SID;

executing a lookup at the first data switching device, the lookup identifying Layer 2 bridging domain information of an incoming interface of the multicast data packet and Layer 2 bridging domain information of an outgoing interface of the multicast data packet, the incoming interface connecting a sender of the multicast data stream with the second data switching device, the outgoing interface connecting a receiver of the multicast data stream with the first data switching device;

removing the Mac-in-Mac encapsulation header;

in response to identifying that a Layer 2 bridging domain corresponding to the outgoing interface is different than a Layer 2 bridging domain corresponding to the incoming interface, modifying a Customer Media Access Control (MAC) Source Address carried in a Customer MAC header field of the multicast data packet; and forwarding the multicast data packet on the outgoing interface without the Mac-in-Mac encapsulation header.

2. The computer-implemented method of claim 1, wherein executing the lookup includes comparing Layer 2 bridging domain information of the incoming interface with Layer 2 bridging domain information of the outgoing interface, and identifying that a VLAN corresponding to the incoming interface does not match a VLAN corresponding to the outgoing interface.

3. The computer-implemented method of claim 1, wherein executing the lookup includes comparing Layer 2 bridging domain information of the incoming interface with Layer 2 bridging domain information of the outgoing interface, and identifying that a VLAN corresponding to the incoming interface matches a VLAN corresponding to the outgoing interface.

4. The computer-implemented method of claim 1, wherein executing the lookup includes:

identifying the incoming interface by executing a lookup using the Layer 2 I-SID set in the I-TAG field of the Mac-in-Mac encapsulation header;

identifying the outgoing interface by executing a lookup using values from a Backbone Virtual Local Area Network field and from the BMAC-DA field of the Mac-in-Mac encapsulation header; and determining whether the incoming interface and the outgoing interface belong to a same Layer 2 broadcast domain.

5. The computer-implemented method of claim 1, wherein modifying the Customer MAC Source Address includes setting the Customer MAC Source Address based on a system identifier of the first data switching device.

6. The computer-implemented method of claim 1, wherein in response to identifying that the Layer 2 bridging domain corresponding to the outgoing interface matches the Layer 2 bridging domain corresponding to the incoming interface, preserving a Customer Media Access Control (MAC) Source Address carried in a Customer MAC header field of the multicast data packet.

7. The computer-implemented method of claim 1, further comprising:
receiving a second multicast data packet from a second incoming interface connected to the first data switching device;
allocating a second data I-SID to a second multicast data stream corresponding to the second multicast data packet;
selecting a second Layer 2 I-SID based on a Layer 2 bridging domain corresponding to the second multicast data packet;
encapsulating the second data packet using Mac-in-Mac encapsulation including setting a second data I-SID in the (BMAC-DA) field, and setting a second Layer 2 I-SID in the I-TAG field, the second data I-SID and the second Layer 2 I-SID being different values; and
forwarding the second multicast data packet via the transport network.

8. A computer program product including a non-transitory computer-storage medium having instructions stored thereon for processing data information, such that the instructions, when carried out by a processing device, cause the processing device to perform the operations of:
receiving a multicast data packet at a first data switching device, the first data switching device functioning as a first Backbone Edge Bridge within a transport network using Shortest Path Bridging (SPB) protocol, the multicast data packet having a Mac-in-Mac encapsulation header added by a second data switching device, the second data switching device functioning as a second Backbone Edge Bridge within the transport network, the multicast data packet received via the transport network from the second data switching device, the Mac-in-Mac encapsulation header carrying a data Backbone Service Instance Identifier (I-SID) set in a Backbone Media Access Control Destination Address (BMAC-DA) field of the Mac-in-Mac encapsulation header, the data I-SID identifying a multicast data stream corresponding to the multicast data packet, the Mac-in-Mac encapsulation header also carrying a Layer 2 I-SID set in a Backbone Service Instance Tag (I-TAG) field of the Mac-in-Mac encapsulation header, the Layer 2 I-SID identifying a Layer 2 bridging domain corresponding to the multicast data packet, the Layer 2 I-SID carrying a different value as compared to a value of the data I-SID;
executing a lookup at the first data switching device, the lookup identifying Layer 2 bridging domain information of an incoming interface of the multicast data packet and Layer 2 bridging domain information of an outgoing interface of the multicast data packet, the incoming interface connecting a sender of the multicast data stream with the second data switching device, the outgoing interface connecting a receiver of the multicast data stream with the first data switching device;
removing the Mac-in-Mac encapsulation header;
in response to identifying that a Layer 2 bridging domain corresponding to the outgoing interface is different than a Layer 2 bridging domain corresponding to the incoming interface, modifying a Customer Media Access Control (MAC) Source Address carried in a Customer MAC header field of the multicast data packet; and
forwarding the multicast data packet on the outgoing interface without the Mac-in-Mac encapsulation header.

9. The computer program product of claim 8, wherein executing the lookup includes comparing Layer 2 bridging domain information of the incoming interface with Layer 2 bridging domain information of the outgoing interface, and identifying that a VLAN corresponding to the incoming interface does not match a VLAN corresponding to the outgoing interface.

10. The computer program product of claim 8, wherein executing the lookup includes comparing Layer 2 bridging domain information of the incoming interface with Layer 2 bridging domain information of the outgoing interface, and identifying that a VLAN corresponding to the incoming interface matches a VLAN corresponding to the outgoing interface.

11. The computer program product of claim 8, wherein executing the lookup includes:
identifying the incoming interface by executing a lookup using the Layer 2 I-SID set in the I-TAG field of the Mac-in-Mac encapsulation header;
identifying the outgoing interface by executing a lookup using values from a Backbone Virtual Local Area Network field and from the BMAC-DA field of the Mac-in-Mac encapsulation header; and
determining whether the incoming interface and the outgoing interface belong to a same Layer 2 broadcast domain.

12. The computer program product of claim 8, wherein modifying the Customer MAC Source Address includes setting the Customer MAC Source Address based on a system identifier of the first data switching device.

13. The computer program product of claim 8, wherein in response to identifying that the Layer 2 bridging domain corresponding to the outgoing interface matches the Layer 2 bridging domain corresponding to the incoming interface, preserving a Customer Media Access Control (MAC) Source Address carried in a Customer MAC header field of the multicast data packet.

14. The computer program product of claim 8, having further instructions stored thereon for processing data information, such that the further instructions, when carried out by the processing device, cause the processing device to perform the operations of:
receiving a second multicast data packet from a second incoming interface connected to the first data switching device;
allocating a second data I-SID to a second multicast data stream corresponding to the second multicast data packet;
selecting a second Layer 2 I-SID based on a Layer 2 bridging domain corresponding to the second multicast data packet;
encapsulating the second data packet using Mac-in-Mac encapsulation including setting a second data I-SID in the (BMAC-DA) field, and setting a second Layer 2 I-SID in the I-TAG field, the second data I-SID and the second Layer 2 I-SID being different values; and
forwarding the second multicast data packet via the transport network.

15. A system for packet switching in a Shortest Path Bridging (SPB) network, the system comprising:
a processor; and
a memory coupled to the processor, the memory storing instructions that, when executed by the processor, cause the system to perform the operations of:
receiving a multicast data packet at a first data switching device, the first data switching device functioning as a first Backbone Edge Bridge within a transport network using Shortest Path Bridging (SPB) protocol, the multicast data packet having a Mac-in-Mac encapsulation header added by a second data switching device, the second data switching device functioning as a second Backbone Edge Bridge within the transport network, the multicast data packet received via the transport network from the second data switching device, the Mac-in-Mac encapsulation header carrying a data Backbone Service Instance Identifier (I-SID) set in a Backbone Media Access Control Destination Address (BMAC-DA) field of the Mac-in-Mac encapsulation header, the data I-SID identifying a multicast data stream corresponding to the multicast data packet, the Mac-in-Mac encapsulation header also carrying a Layer 2 I-SID set in a Backbone Service Instance Tag (I-TAG) field of the Mac-in-Mac encapsulation header, the Layer 2 I-SID identifying a Layer 2 bridging domain corresponding to the multicast data packet, the Layer 2 I-SID carrying a different value as compared to a value of the data I-SID;

executing a lookup at the first data switching device, the lookup identifying Layer 2 bridging domain information of an incoming interface of the multicast data packet and Layer 2 bridging domain information of an outgoing interface of the multicast data packet, the incoming interface connecting a sender of the multicast data stream with the second data switching device, the outgoing interface connecting a receiver of the multicast data stream with the first data switching device;

removing the Mac-in-Mac encapsulation header;

in response to identifying that a Layer 2 bridging domain corresponding to the outgoing interface is different than a Layer 2 bridging domain corresponding to the incoming interface, modifying a Customer Media Access Control (MAC) Source Address carried in a Customer MAC header field of the multicast data packet; and forwarding the multicast data packet on the outgoing interface without the Mac-in-Mac encapsulation header.

16. The system of claim 15, wherein executing the lookup includes comparing Layer 2 bridging domain information of the incoming interface with Layer 2 bridging domain information of the outgoing interface, and identifying that a VLAN corresponding to the incoming interface does not match a VLAN corresponding to the outgoing interface.

17. The system of claim 15, wherein executing the lookup includes comparing Layer 2 bridging domain information of the incoming interface with Layer 2 bridging domain information of the outgoing interface, and identifying that a VLAN corresponding to the incoming interface matches a VLAN corresponding to the outgoing interface.

18. The system of claim 15, wherein executing the lookup includes:
    identifying the incoming interface by executing a lookup using the Layer 2 I-SID set in the I-TAG field of the Mac-in-Mac encapsulation header;
    identifying the outgoing interface by executing a lookup using values from a Backbone Virtual Local Area Network field and from the BMAC-DA field of the Mac-in-Mac encapsulation header; and
    determining whether the incoming interface and the outgoing interface belong to a same Layer 2 broadcast domain.

19. The system of claim 15, wherein in response to identifying that the Layer 2 bridging domain corresponding to the outgoing interface matches the Layer 2 bridging domain corresponding to the incoming interface, preserving a Customer Media Access Control (MAC) Source Address carried in a Customer MAC header field of the multicast data packet.

20. The system of claim 15, the memory storing further instructions that, when executed by the processor, cause the system to perform the operations of:
    receiving a second multicast data packet from a second incoming interface connected to the first data switching device;
    allocating a second data I-SID to a second multicast data stream corresponding to the second multicast data packet;
    selecting a second Layer 2 I-SID based on a Layer 2 bridging domain corresponding to the second multicast data packet;
    encapsulating the second data packet using Mac-in-Mac encapsulation including setting a second data I-SID in the (BMAC-DA) field, and setting a second Layer 2 I-SID in the I-TAG field, the second data I-SID and the second Layer 2 I-SID being different values; and
forwarding the second multicast data packet via the transport network.

* * * * *